No. 829,783. PATENTED AUG. 28, 1906.
M. R. HANNA.
BLOCK SIGNAL SYSTEM.
APPLICATION FILED MAR. 10, 1905.
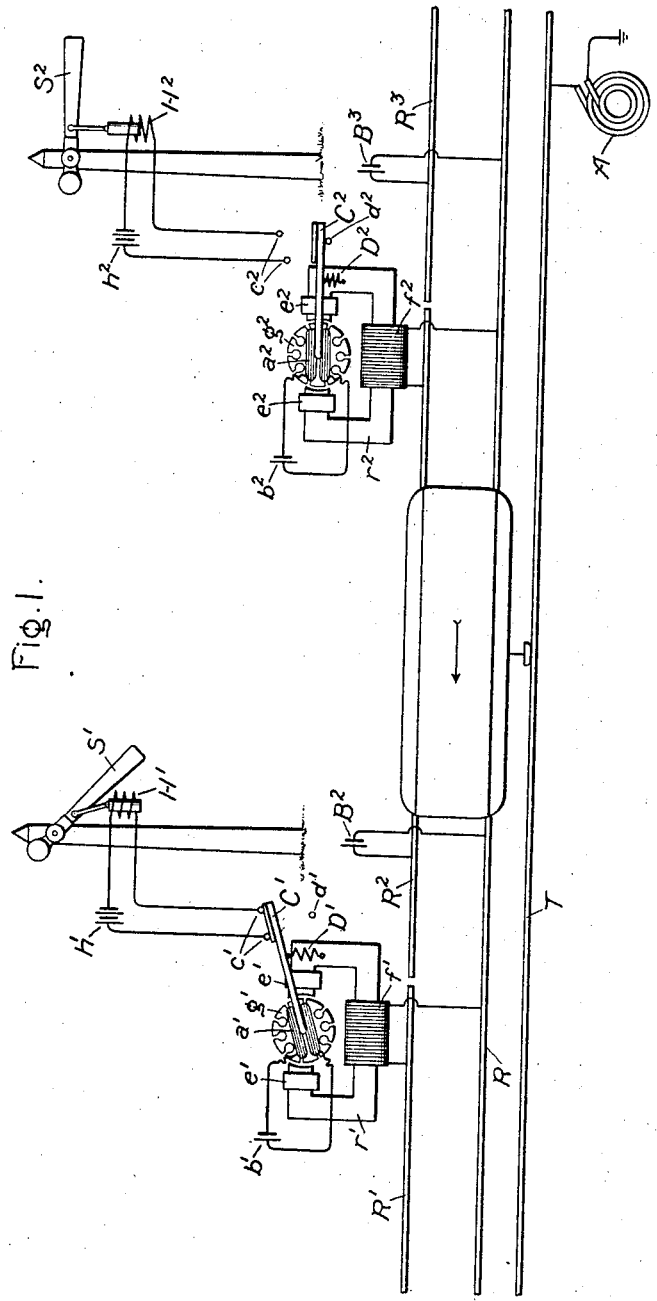
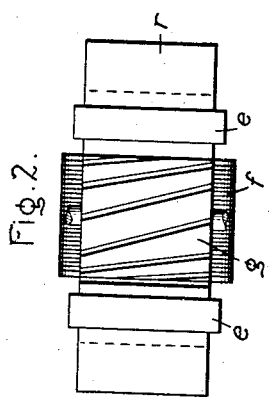
Witnesses.
Inventor.
Max R. Hanna.
by Albert G. Davis
Att'y.

UNITED STATES PATENT OFFICE.

MAX R. HANNA, OF SCHENECTADY, NEW YORK, ASSIGNOR TO GENERAL ELECTRIC COMPANY, A CORPORATION OF NEW YORK.

BLOCK-SIGNAL SYSTEM.

No. 829,783.    Specification of Letters Patent.    Patented Aug. 28, 1906.

Application filed March 10, 1905. Serial No. 249,375.

*To all whom it may concern:*

Be it known that I, MAX R. HANNA, a citizen of the United States, residing in Schenectady, county of Schenectady, State of New York, have invented certain new and useful Improvements in Block-Signal Systems, of which the following is a specification.

My invention relates to block-signals for electrically-operated railways in which the driving-motors are supplied with alternating current. When relays of the ordinary type are employed for the signal systems of electrically-operated roads, trouble is likely to arise from the fact that leakage of power-current may operate the relays so as to give a clear indication when a train is in a block.

My invention consists, in the combination, with an altenating-current railway system employing the rails as a return-conductor, of a direct-current signal system comprising a novel form of relay which is responsive to direct current only, and consequently cannot be affected by leakage from the alternating-current power-circuit. For this purpose I employ a relay of the wattmeter or dynamometer type comprising two relatively movable coils. One of these coils I connect to the track-circuit, while the other is supplied with direct current independently of the track-circuit.

Since the operation of the relay depends upon the reaction of the currents in the two coils upon each other and since an alternating current in one coil acting upon a direct current in the other can produce no torque, an alternating current in the track-circuit coil leaking from the power-circuit can have no effect upon the direct current in the second coil.

Since the rails are employed as return-conductors for the power-circuit, a large alternating current flows through the rails, and consequently under certain conditions of faulty bonding an alternating current excessive in amount as compared with the normal relay-current may flow through the relay-coil that is connected to the track-circuit. If this large alternating current in the stationary coil should induce an alternating current in the movable coil, the two alternating currents would react on each other, producing a torque in the same way that a torque is produced in the well-known repulsion-motor. With large alternating currents flowing through the stationary coil this torque might be great enough to interfere with the operation of the relay, either causing it to set the signal at "clear" when it should be at "danger," and thus rendering accidents possible, or causing it to set the signal at "danger" when it should be at "clear," and thereby unnecessarily delaying traffic. In order to prevent absolutely any possibility of a repulsion-motor action, due to the leakage of power-current, causing the relay to give a clear signal at the wrong time, I so arrange the two relay-coils relatively to each other that the movable coil in moving to its danger position moves in the direction of the torque, due to the repulsion-motor action. With this arrangement it is absolutely impossible that a leakage of power-current through one coil of the relay should produce a false clear indication of the signal, although it might hold the relay in danger position when it should move to clear position, thereby delaying traffic. I have, however, provided means for overcoming this objection by providing an arrangement for reducing the repulsion-motor action under any conditions to a negligible amount. I accomplish this by mounting short-circuited conductors on the magnetic circuit between the stationary and movable coils which act to screen the alternating-current flux due to leakage of power-current in one coil from the other coil. With this arrangement practically no alternating current can ever be induced in the movable coil, so that all repulsion-motor action is substantially eliminated or reduced to a negligible amount.

The most efficient operation of the relay and the greatest torque are obtained when the movable coil is mounted on a magnetic core, and accordingly I provide a movable core for carrying the movable coil and so arrange this core that the reluctance of the magnetic circuit of the relay is the same for all positions of the core.

My invention will best be understood by reference to the accompanying drawings, in which, Figure 1 shows, somewhat diagrammatically, a block-signal system arranged in accordance with my invention, and Fig. 2 shows a plan view of the relay.

In the drawings, R represents one rail of the track, which is shown continuous so as to serve as a return-conductor for the power-current. The other rail is sectionalized, portions of three sections or blocks R', R², and R³ being shown in the drawings. T represents the third rail or trolley-line for supplying power-current to the cars or trains, and this conductor is shown energized from an alternating-current generator A. The track-circuits are supplied with current from the usual track-batteries, two of these batteries B² and B³ being shown in the drawings. These batteries are connected to one end of each block, while to the other end of each block is connected one coil of the relay for controlling the signal for that block. Two signals S' and S² are shown at or near the entrance to the blocks R' and R², respectively. These signals are provided with any suitable form of operating mechanism. For the sake of simplicity I have shown the operating mechanism consisting of a simple solenoid H', arranged when energized to draw the signal to clear position and when deënergized to allow the signal to be drawn to "danger" by its counterweight. The solenoid H' is supplied from any suitable source of current, either direct or alternating, (indicated by the battery $h'$.) It will be understood that while for the sake of simplicity I have shown a simple solenoid for operating the signal, any well-known form of driving mechanism may be employed.

The circuit of the operating mechanism for the signal S' comprises two contacts $c'$, which are adapted to be bridged by a contact-arm C' of the relay $r'$. This relay comprises two relatively movable coils. The stationary or field coil $f'$ is shown connected across the rails R and R', and consequently is supplied with direct current from the track-battery at the other end of the block. The movable or armature coil $a'$ is mounted rotatably on a magnetic core $g'$ and is energized from a source of direct current (indicated by the battery $b'$) independently of the track-circuit. The two coils $a'$ and $f'$ are so connected to their respective batteries that the battery-current in the coils produces a torque which tends to maintain the arms C' in engagement with the contacts $c'$, and consequently to hold the signal S' at clear position, as shown, as long as both coils are traversed by direct current. If a car or train enters one of the blocks, as is indicated in the block R², the relay-coil $f²$, connected to the track-circuit of that block, is short-circuited and the contact-arm C² is drawn away from the contacts $c²$ against the stop $d²$ by a spring D² or by gravity. The circuit of the operating mechanism of the signal S² is thereby opened, allowing the signal to go to "danger," so as to indicate the presence of a car in the block. It will be seen that when the movable coil is in the position shown at $a²$ it is parallel to the flux produced by the stationary coil $f²$, so that an alternating current passing through coil $f²$ could induce no current in the coil $a²$. When the movable coil is in the position shown at $a'$, however, an alternating flux produced by the coil $f'$ would tend to induce an alternating current in the coil $a'$; but it will be seen that the repulsion-motor action due to this induced current will produce a torque tending to assist the spring D' in moving the contact-arm to its danger position. Consequently it is absolutely impossible for a car to produce an operation of the relay of that block to give a clear position. The only effect that it can produce is to assist the normal movement of the relay toward danger position.

Since under certain circumstances a large alternating current from the power-circuit might leak through a coil when no car was in the block, it is desirable that the effect of alternating current upon the relay should be at all times exceedingly small, since otherwise the relay might be held in its danger position when no car was in the block and would thereby delay traffic unnecessarily. In order to eliminate substantially all effect of the alternating current upon the relay, I provide short-circuiting conductors $e$, surrounding the poles of the stationary portion of the magnetic circuit. These short-circuited conductors act as flux-screens, tending to prevent the passage of any appreciable amount of alternating flux through the movable core. These conductors are preferably close to the armature and at some distance from the field-coil, so as to prevent the alternating flux from passing through the armature and to permit it to leak through the air between the parts of the field-core on opposite sides of the field-coil. Consequently no alternating current of any appreciable amount can ever be induced in the movable coil, and even in the clear position of the relay with a comparatively large flow of current through the stationary coil the operation of the relay is affected to a negligible degree.

In order to secure the most efficient operation and the highest torque, it is essential that the movable coil should be mounted upon a magnetic core; but if a magnetic core is employed which by its movement produces a variation of the reluctance of the magnetic circuit of the relay a torque may be produced due to this cause which may have a disturbing effect on the action of the relay. Consequently I arrange the movable magnetic core $g$, as shown in Fig. 2, with evenly-spaced slots all the way around the core, each slot being arranged on a spiral. With this arrangement the magnetic reluctance of the movable core is the same on any diameter, and so, although only a portion of the slots are employed for carrying the movable coil, the remainder of the slots serve a useful purpose in making the movable core entirely symmetrical with respect to its reluctance.

It will be understood that for the sake of simplicity I have shown my invention somewhat diagrammatically and that in practice any well-known forms of apparatus may be employed in carrying out my invention. Accordingly I do not desire to limit myself to the particular construction and arrangement of parts here shown, but aim in the appended claims to cover all modifications which are within the scope of my invention.

What I claim as new, and desire to secure by Letters Patent of the United States, is—

1. In combination with an alternating-current railway system employing the rails as return-conductor for the power-current, a direct-current signal system comprising means for supplying direct current to the track-circuits, relays each comprising two relatively movable coils, one connected to the track-circuit and the other supplied with direct current independently of the track-circuit, and signals controlled by the relays.

2. In combination with an alternating-current railway system employing the rails as return-conductor for the power-current, a direct-current signal system comprising means for supplying direct current to the track-circuits, relays each comprising two relatively movable coils, one connected to the track-circuit and the other supplied with direct current independently of the track-circuit, contact-arms carried by the movable coils of the relays, and signals controlled by said contact-arms.

3. In combination with an alternating-current railway system employing the rails as return-conductor for the power-current, a direct-current signal system comprising means for supplying direct current to the track-circuits, a relay comprising a stationary coil connected to the track-circuit and a movable coil supplied with direct current independently of the track-circuit, a contact-arm carried by the movable relay-coil, and a signal controlled by said contact-arm.

4. In combination with an alternating-current railway system employing the rails as return-conductor for the power-current, a direct-current signal system comprising means for supplying direct current to the track-circuits, a relay comprising a stationary coil connected to the track-circuit and a movable coil supplied with direct current independently of the track-circuit, a contact-arm carried by the movable relay-coil and arranged to close and open an electric circuit, the movement of said arm to open said circuit being toward the position in which the movable coil lies parallel to the flux produced by the stationary coil of the relay.

5. In combination with an alternating-current railway system employing the rails as return-conductor for the power-current, a direct-current signal system comprising means for supplying direct current to the track-circuits, a relay comprising two relatively movable coils, one connected to the rails of a block and the other supplied with direct current independently of the track-circuit, and a signal controlled by the movement of the movable relay-coil, the movement of said coil to produce a movement of said signal to danger being toward the position in which said movable coil lies parallel to the flux produced by the stationary coil of the relay.

6. In combination with an alternating-current railway system employing the rails as return-conductor for the power-current, a direct-current signal system comprising means for supplying direct current to the track-circuit, and a relay comprising two relatively movable coils, one connected to the track-circuit and the other supplied with direct current independently of the track-circuit, and a short-circuited conductor in inductive relation to the coil connected to the track-circuit and adapted and arranged to screen a flux due to alternating current in said coil from the second coil.

7. In combination with an alternating-current railway system employing the rails as return-conductor for the power-current, a direct-current signal system comprising means for supplying direct current to the track-circuit, and a relay comprising a stationary field member, a coil thereon connected to the track-circuit, a second coil movably supported between the poles of said field member and supplied with direct current independently of the track-circuit, and short-circuited conductors carried on the poles of said field member.

8. In combination with an alternating-current railway system employing the rails as return-conductor for the power-current, a direct-current signal system comprising means for supplying direct current to the track-circuit, and a relay comprising a stationary field member, a coil thereon connected to the track-circuit, a second coil movably supported between the poles of said field member and supplied with direct current independently of the track-circuit, and short-circuited conductors surrounding said field member at points between said stationary coil and the pole-faces of said member.

9. In a relay, a stationary field member, an energizing-coil therefor, a uniformly-slotted core rotatably mounted between the poles of said field member, a winding carried by said core and occupying a portion only of said slots, and a contact-arm carried by said core.

10. In a relay, a stationary field member, an energizing-coil therefor, a magnetic core rotatably mounted between the poles of said field member and provided with uniformly-spaced spiral slots, a coil carried in a portion of said slots, and a contact-arm carried by said core.

11. In combination with an alternating-current railway system employing the rails as return-conductors for the power-current, a direct-current signal system comprising means for supplying direct current to the track-circuits, relays each comprising two coöperating coils, one connected to the track-circuit and the other supplied with direct current independently of the track-circuit, and signals controlled by the relays.

12. In combination with an alternating-current railway system employing the rails as return-conductors for the power-current, a direct-current signal system comprising means for supplying direct current to the track-circuits, relays each comprising two coöperating coils, one connected to the track-circuit and the other supplied with direct current independently of the track-circuit, movable contacts controlled by the joint action of said coils, and signals controlled by said contacts.

In witness whereof I have hereunto set my hand this 9th day of March, 1905.

MAX R. HANNA.

Witnesses:
BENJAMIN B. HULL,
HELEN ORFORD.